S. S. BROWN.
FIRE-KINDLER.
No. 181,033.  Patented Aug. 15, 1876.
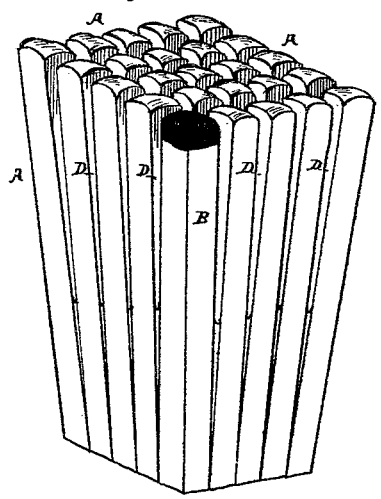
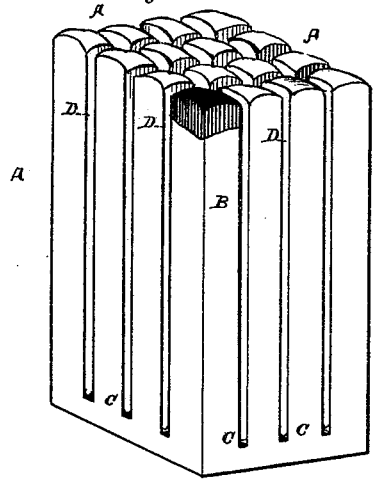

UNITED STATES PATENT OFFICE.

SAMUEL S. BROWN, OF RICHMOND, INDIANA.

IMPROVEMENT IN FIRE-KINDLERS.

Specification forming part of Letters Patent No. 181,033, dated August 15, 1876; application filed January 20, 1876.

*To all whom it may concern:*

Be it known that I, SAMUEL S. BROWN, of Richmond, county of Wayne and State of Indiana, have invented certain Improvements in Self-Igniting Fire-Kindlers, of which the following is a specification:

My invention relates to self-lighting fire-kindlers, constructed in such manner as to admit of free circulation of air between the sticks or parts of which the bundle is composed, the whole being boiled or dipped in resin or any suitable inflammable substance, and having one of the sticks of which the bundle is composed, or one corner of the bundle, dipped into any of the substances usually employed in making lucifer matches, thus forming a self-igniting bundle or fire-kindler.

Figure 1 is a perspective view, showing the bundle with openings or air-spaces made by splitting, with match attached. Fig. 2 is a perspective view, showing the bundle with the air-spaces made by sawing; also, with match attached.

A A are the bundles, Figs. 1 and 2; D, the air spaces or openings, and B the match. In the manufacture of my fire-kindler the operation, in the first place, is very similar to making common square matches. The wood, being in blocks of suitable length, is pressed or mashed on the end, so that the pieces, when split, will hold together at one end till after they have been dipped or boiled in resin. In the second instance, the blocks are altogether prepared by sawing. The pieces are first sawed out in long strips, and are then cut up in short pieces, and two or more kerfs are sawed lengthwise nearly through to the end. The block is then turned one-quarter over, and a like operation completed, which, when done, leaves a bundle of sticks or pieces connected at one end, as shown at C, Fig. 2. The plan just described is the most desirable, inasmuch as any kind of timber can be used, whether it be knotty or cross-grained, while in the former instance straight-grained wood only can be used.

The wooden blocks having been prepared as stated above, are then put into a kettle or caldron of melted resin with a little tallow and bees-wax, and allowed to stay a short time till the mixture cooks well into the wood. They are then taken out and allowed to drain for a few minutes, and then put into sawdust to dry, which, when completed, one corner or one stick of the bundle is dipped into the match-solution.

Having thus fully described my invention, what I claim, and desire to secure by Letters Patent, is—

The kindler or bundle A, made as described, in combination with the match B, whereby the kindler is made self-igniting, substantially as shown and described.

SAMUEL S. BROWN.

Witnesses:
 W. E. BELL,
 JOHN HOWARTH.